United States Patent [19]

Mutsushita

[11] 4,101,223

[45] Jul. 18, 1978

[54] ATTACHMENT MEMBER FOR EXCHANGEABLE LENSES

[75] Inventor: Shuzo Mutsushita, Ikeda, Japan

[73] Assignee: Minolta Camera Kabushiki Kaisha, Japan

[21] Appl. No.: 813,657

[22] Filed: Jul. 7, 1977

[30] Foreign Application Priority Data

Jul. 12, 1976 [JP] Japan .............................. 51-91649[U]

[51] Int. Cl.² ............................................. G03B 17/00
[52] U.S. Cl. .................................................. 354/286
[58] Field of Search ............... 354/202, 286, 288, 289, 354/295, 354, 273

[56] References Cited
FOREIGN PATENT DOCUMENTS 2,546,465  3/1978  Fed. Rep. of Germany ....... 354/286

*Primary Examiner*—Michael L. Gellner
*Attorney, Agent, or Firm*—Watson, Cole, Grindle & Watson

[57] ABSTRACT

Disclosed is an attachment member including a substantially circular body adapted to be releasably attachable to the outer periphery of an exchangeable lens of the type, which when mounted on a single lens reflex camera body, is adapted to transmit to the camera body only information as to the step-difference between a minimum $f$-number of the lens and a $f$-number set by a diaphragm setting ring of the lens. The attachment member includes a transmitting member on the substantially circular body at an angular position dependent upon the maximum $f$-number of the exchangeable lens to be used therewith. Thus when the attachment member is attached to an exchangeable lens at the predetermined angular position, the attachment member is capable of transmitting to a camera body information as to the maximum $f$-number of the exchangeable lens. Therefore, by the use of an attachment member in accordance with the present invention, when the diaphragm setting ring of the lens is set to a minimum aperture (maximum $f$-number position), two types of information are transmitted to the camera body and provide, in combination, information as to minimum $f$-number of the exchangeable lens to the camera mechanism. This information as to minimum $f$-number is essential for automatically determining the proper $f$-number of an aperture setting for a particular exposure prior to a stopping down operation of the diaphragm of the exchangeable lens.

34 Claims, 4 Drawing Figures

ATTACHMENT MEMBER FOR EXCHANGEABLE LENSES

BACKGROUND OF THE INVENTION

The present invention relates to an attachment member detachably attachable to an exchangeable camera lens which is adapted to be used with a camera body having through-the-lens (T.T.L.) light measuring system, and more particularly, pertains to an attachment member for transmitting information as to the maximum $f$-number value or minimum diaphragm aperture available for the exchangeable lens to a camera body.

In full-aperture light measurement through an exchangeable lens which is detachably mounted on a camera body, there are two types of methods of transmitting information as to the set diaphragm aperture of the lens to the camera body. The first type requires two transmitters, one for transmitting information as to the minimum $f$-number (full aperture value) of the lens, and the other for transmitting information as to the set $f$-number (diaphragm aperture value) of the lens. The second type of method necessitates only a single transmitting member which transmits information as to the step difference from the minimum $f$-number to the set $f$-number.

The present invention is directed to the latter type of information transmittal. In this type of information transmitting mechanism, it is possible to control the exposure time in accordance with scene brightness and the set $f$-number of the lens by taking into consideration the fully open aperture through which the scene brightness is measured, as well as to indicate, before the diaphragm is stopped down, the exposure time to be determined or executed. However, this type of mechanism is not applicable for the indication of a diaphragm aperture to be controlled automatically in accordance with scene brightness and a selected, manually set shutter speed as the single transmitting member only transmits information as to the step difference but not information as to the minimum $f$-number of the lens which is necessary for indication of the $f$-number or of diaphragm aperture value to be controlled automatically.

To make an exchangeable lens having the second type of information transmission mechanism available for camera bodies provided with a shutter-priority automatic diaphragm control, it was proposed in U.S. pat. application Ser. No. 769,832 of Kuramoto et al filed on Feb. 17, 1977, which was assigned to the same assignee as that of the present application, to provide the exchangeable lens with a second information transmitting member to transmit information as to the maximum $f$-number to the lens so that information as to the minimum $f$-number may be obtained in the camera body by combining this information with the information as to the step difference transmitted by the first transmitting member when the diaphragm aperture setting member is set to a maximum $f$-number or automatic aperture control position. However, this proposed mechanism requires an additional member to be incorporated into the exchangeable lens and thus conventional exchangeable lenses having only the single transmitting member cannot provide information for the indication of automatic aperture control.

SUMMARY OF THE INVENTION

Accordingly, it is a primary object of the present invention to provide an attachment member which enables an exchangeable lens having a single member for transmitting information as to the step difference from a full to a set aperture value to transmit information as to a maximum $f$-number of the lens to a camera body.

It is another object of the present invention to provide an attachment member for an exchangeable lens of the conventional type which is adapted only to transmit to a camera body information as to the step-difference between a minimum $f$-number thereof and a $f$-number corresponding to an aperture value set by a diaphragm setting ring of the lens, the attachment member enabling the lens to transmit information to a single lens reflex camera body such that the camera body can indicate a $f$-number corresponding to an automatically controlled aperture prior to a stopping-down of the diaphragm.

In accomplishing these objects, an attachment member of the present invention includes a substantially circular body adapted to be releasably attached to the outer periphery of an exchangeable lens and information transmitting means arranged on the substantially circular body at an angular position dependent on a maximum $f$-number of the exchangeable lens to be used therewith. When the substantially circular body is attached to the outer periphery of the exchangeable lens at the predetermined angular position, the information transmitting means of the attachment member is capable of transmitting information as to the maximum $f$-number of the lens to a camera body.

When the information thus transmitted to the camera body by the attachment member is combined with information as to the step-difference between the minimum $f$-number of the exchangeable lens and a $f$-number corresponding to the aperture with the diaphragm setting ring set to the minimum aperture (maximum $f$-number) of the lens, information as to the minimum $f$-number can be obtained within the camera body. With information as to the minimum $f$-number, indication of a $f$-number corresponding to an automatically controlled aperture is made possible prior to a stopping-down operation of the diaphragm. As is conventional in the art, information as to the step-difference between the minimum $f$-number and a $f$-number corresponding to the set aperture is transmitted to the camera body when the exchangeable lens is mounted on the camera body.

The manner and mechanism by which the camera body is able to receive the information transmitted by the transmitting members of the lens are known in the art and an example of such is set forth in U.S. Pat. application Ser. No. 769,832 to Kuramoto et al filed Feb. 17, 1977, the disclosure of which is hereby incorporated by reference.

Thus, the attachment member of the present invention makes it possible to use a series of exchangeable lenses of the conventional type which are adapted to only transmit to the camera information as to the step-difference between a minimum $f$-number of the lens and a $f$-number corresponding to a set aperture, with a camera body capable of indicating a $f$-number corresponding to an automatically controlled aperture prior to a stopping-down operation.

According to the preferred embodiments of the present invention, the substantially circular body of the attachment member has a dimension such as to be releasably attached to the outer periphery of a diaphragm setting ring or to the outer periphery of a fixed outer sleeve adjacent to the diaphragm setting ring of an exchangeable lens. In the case where the substantially circular body of the attachment member is attached to the outer periphery of the diaphragm setting ring of the exchangeable lens, the information transmitting means on the substantially circular body is capable of transmitting information as to the maximum f-number of the lens to the camera body only when the diaphragm setting ring is set to the minimum aperture corresponding to the maximum f-number. In contrast, in the case where the substantially circular body of the attachment member is attached to the fixed outer sleeve of the exchangeable lens, the information transmitting means on the substantially circular body is capable of transmitting information as to the maximum f-number to the camera body regardless of the aperture to which the diaphragm setting ring is set.

In addition, according to the preferred embodiments of the present invention, the attachment member is provided with means for indicating the predetermined position of the substantially circular body at which the substantially circular body is to be attached to a particular position on the exchangeable lens. This means facilitates the attachment of the substantially circular body to the exchangeable lens at a predetermined angular position. Furthermore, means are provided on the attachment member to restrict the movement of the circular body in an angular direction and also in the direction of the optical axis of the exchangeable lens.

The above and other objects and features of the present invention will become more fully apparent from a detailed consideration of the following description in conjunction with the accompanying drawings.

BRIEF DESCRIPTION OF THE DRAWINGS

Referring now to FIG. 1, shown is a conventional exchangeable lens adapted to be mounted on a camera body (not shown) of the type having T.T.L. light measuring system. Exchangeable lens 1 includes a diaphragm setting ring 2 having a transmitting member 3 for transmitting to a camera body (not shown) information as to the step difference from minimum f-number of the lens (f:1.4 in the case of this Figure) to a f-number set by the diaphragm setting ring. In addition, exchangeable lens 1 includes a field depth indicating ring 4 having indicia 5 for setting the object distance or camera-to-subject distance. On the same field depth indicating ring 4 is a mark 6, in the shape of a small boss, for indicating the angular position of the lens relative to a camera body when the lens is to be attached to the camera body.

FIG. 2 shows an attachment member 10 in accordance with the present invention which may be detachably attached to the exchangeable lens 1. Attachment member 10 comprises a resilient, substantially circular body which may be fitted around diaphragm setting member 2 of lens 1 and which extends more than 180° in circumference with a cut-away portion A having an length corresponding to the length of portion A on the diaphragm setting ring 2. At the inner side of the attachment member 10 are a plurality of regularly formed grooves 11 in the form similar to that of a caterpillar tread such that a knurl 7 on diaphragm setting ring 2 may be fitted therein. Further, a transmitting member 12 for transmitting information as to the maximum f-number of a lens to a camera body is on the attachment member 10 as a projection extending perpendicular to the plane of an edge of the attachment member. The angular position of the transmitting member 12 on the circumference of member 10 depends upon the maximum f-number of the exchangeable lens on which the attachment member 10 is to be mounted or fitted. Thus information as to the maximum f-number of the lens may be transmitted to a camera body when the exchangeable lens 1 with the attachment member 10 is mounted on the camera body and diaphragm setting ring 2 of the lens is set to the position where a letter or a sign representative of the maximum f-number is registered with indicia 5. In addition, the attachment member 10 is provided with a positioning member 13 for restricting the movement of the attachment member on the diaphragm setting ring 2 in the direction of the optical axis of the exchangeable lens 1. The outer surface of the attachment member 10 is marked with an indication of the type of exchangeable lens to which the attachment member is suitable. This indication may be a designation of the focal length and range of f-numbers available of the lens, such as f:1.4 - f:22.

Figure 1:
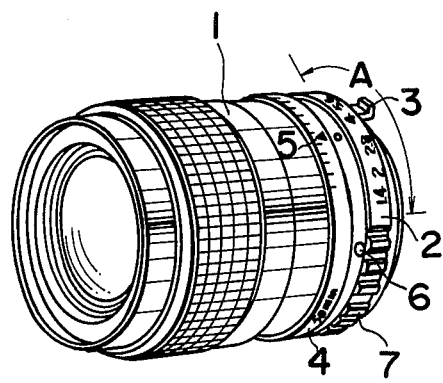
FIG. 1 is a perspective view of an exchangeable lens to which an attachment member according to the present invention may be attached.

Therefore, if an attachment member 10 is fitted on to an exchangeable lens 1 of the type indicated with the outer surface of the attachment member at a predetermined angular position and with the grooves 11 engaged the knurls 7 of the diaphragm setting ring 2 until the positioning member 13 engages the rear of the diaphragm setting ring, it will be possible, when the exchangeable lens is mounted on a camera body and the diaphragm setting ring is set to the maximum f-number position, to transmit information as to the maximum f-number of the lens to the camera body through the transmitting member 12. The information as to the maximum f-number of the lens thus transmitted by the attachment member to the camera body is combined with the information of the step difference from the minimum to the maximum f-number transmitted by transmitting member with ring 2 set to a maximum f-number position such that information as to the minimum f-number of the lens may be obtained by the camera body.

The mechanism of obtaining information by minimum f-number may be explained as follows with reference to APEX notation. According to the APEX notation system:

$$Av = (Sv + Bvo - Tv) + Avo = (Sv + Bvo - Tv) + (Avc - Pc)$$

where;

$Av$ is an aperture value to be determined by an automatic control device.

$Sv$ is a set film sensitivity or speed value.

$Bvo$ is a luminance value of the photographic object measured through a full aperture.

$Tv$ is a set exposure time value.

$Avo$ is an aperture value of a minimum f-number (full aperture) of an exchangeable lens.

$Avc$ is an aperture value corresponding to a maximum f-number (minimum aperture) of an exchangeable lens.

Pc is a value corresponding to steps or step difference from the minimum to the maximum f-number of a lens.

As is shown in the Figures, if the diaphragm setting ring 2 of an exchangeable lens 1 to which an attachment member 10 is fitted is set to the maximum f-number position of the lens, the transmitting member 3 of the diaphragm setting ring transmits information as to the steps from a minimum to maximum f-number i.e. Pc with the transmitting member 12 of the attachment member transmitting information as to a maximum f-number, i.e., Avc. Therefore, a camera body receiving these two types of information can combine them to obtain information as to the minimum f-number (Avo) of the lens. Thus, with the information as to the minimum f-number (Avo) and the scene brightness measured through fully open aperture (Bvo), an f-number of the proper diaphragm aperture (Av) for the lens to be determined automatically may be indicated prior to actual photography.

Figure 2:
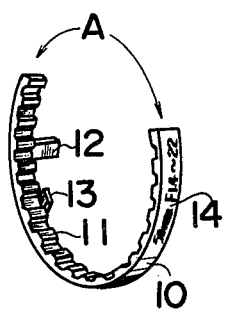
FIG. 2 is a perspective view of an attachment member according to a first embodiment of the present invention.
Figure 3:
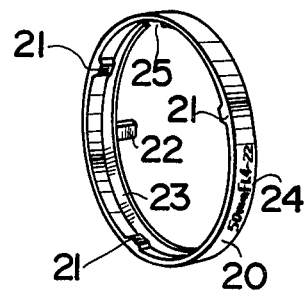
FIG. 3 is a perspective view of an attachment member according to a second embodiment of the present invention.

Figure 3 shows another embodiment of the attachment member of the present invention wherein the attachment member 20 includes a substantially circular body having no opening as is provided in the first embodiment of FIG. 2. The portion of the attachment member 10 which covers the f-number scale of diaphragm setting ring 2 is made transparent so that the scale may be observed therethrough. The attachment member 20, like the attachment member 10 of FIG. 2, includes several fitting members 21 in the form of projections fittable about knurls 7 on diaphragm setting ring 2, a transmitting member 22 for transmitting information as to the maximum f-number of a lens, positioning member 23 for restricting the movement of the attachment member in the direction of optical axis of the lens, and indicating mark 24 indicative of the type of exchangeable lens to which the attachment member may be applied. The positioning member 23 of this embodiment is adapted to engage the diaphragm setting member 2 of the exchangeable lens 1. On the inner periphery of the attachment member 20 is a recess 25 through which the transmitting member 3 of lens 1 may pass when mounting of the attachment member on the lens and which also serves to determine the angular position of the attachment member relative to the diaphragm setting ring 2.

Figure 4:
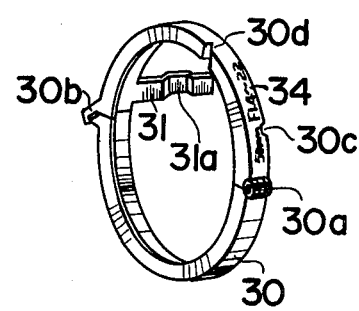
FIG. 4 is a perspective view of an attachment member according to a third embodiment of the present invention.

Attachment member 30 shown in FIG. 4 as still another embodiment of the present invention is constructed so as to fit onto, instead of the diaphragm setting ring 2 of a lens 1, a fixed portion of the exchangeable lens, such as the field depth indicator ring. By means of this construction, the transmitting member 31 of the attachment member 30 is always coupled with an information receptive member of a camera body when the exchangeable lens is mounted on a camera body. Accordingly, attachment member 30 should be detached from the lens so as to interrupt transmission of information as to the maximum f-number of the lens when such information is unnecessary as is the case of automatic exposure time control.

Attachment member 30 includes a generally circular body which is hinged at 30a to open and close. Hence, the attachment member 30, being opened, is mounted about the exchangeable lens and then closed and locked at 30b so as to be fixed thereto.

Information transmitting member 31 of attachment member 30 extends rearwardly, i.e. towards a camera body. The attachment member 30 also includes a notch 30c which is adapted to be engaged by small boss 6 on the lens 1 for the indication of the angular position of the exchangeable lens relative to the camera body upon mounting the lens thereon, so that location of the attachment member is fixed angularly and in the direction of the optical axis of the lens. Another notch 30d formed on attachment member 30 is registered with indicia 5 when notch 30c is engaged by small boss 6, thereby indicating that attachment member 30 is properly positioned on the lens. Attachment member 30 is also provided with indication 34 of type of exchangeable lens for which the attachment member is suitable.

With this third embodiment, it may be beneficial to form a depression or hollow 31a in transmitting member 31 to engage diaphragm setting ring 2 so as to urge the latter radially inwardly to prevent the ring from moving arbitrarily and maintain the ring in a set position.

According to the present invention as shown by the above non-limiting embodiments, by only attaching an attachment member to a lens at given location, a conventional exchangeable lens having only a single transmitting member which transmits to camera body information of steps from minimum to set f-number will allow the use of the lens with a camera in which both automatic diaphragm and automatic shutter controls are possible, as the attachment member will provide information as to the minimum f-number of the exchangeable lens thereby providing for an indication of a f-number to be determined automatically by an automatic diaphragm control mode of the camera body.

As used herein, the term "substantially circular" when describing the body of the attachment member includes a semi-circular ring like shape having a circumference of at least 180° up to and including a complete closed ring like shape having a circumference of 360°. The term is intended to at least encompass the particular shapes of the attachment members as shown in the present drawings.

I claim:

1. An attachment member adapted for use in conjunction with an exchangeable lens for a single lens reflex camera body where the exchangeable lens is of the type including a diaphragm setting ring manually rotatable for setting a desired diaphragm aperture and information transmitting means arranged on said diaphragm setting ring for transmitting to a camera body information as to the step-difference between a minimum f-number of the exchangeable lens and a set f-number corresponding to the diaphragm aperture set by said diaphragm setting ring when the exchangeable lens is mounted on a camera body.

said attachment member comprising:
a substantially circular body adapted to be releasably attached to the outer periphery of said exchangeable lens; and
an information transmitting means arranged on said substantially circular body at an angular position thereon dependent upon a maximum f-number of the particular exchangeable lens to be used therewith and adapted for transmitting to a camera body information as to be maximum f-number of the exchangeable lens when the substantially circular body is attached to the exchangeable lens at a predetermined angular position, and the exchangeable lens is in turn mounted on a camera body, whereby with the diaphragm setting ring of an exchangeable lens set to a minimum aperture corresponding to the maximum f-number, information as to the minimum f-number of the exchangeable lens may be obtained within a camera body when information thus transmitted by the information transmitting means of the lens and the attachment member to the camera body is combined.

2. An attachment member as defined in claim 1, further including means for indication the predetermined angular position of said substantially circular body at which said circular body is to be attached to an exchangeable lens.

3. An attachment member as defined in claim 2, wherein said substantially circular body has a dimension such as to be able to be attached to the outer periphery of a diaphragm setting ring of an exchangeable lens, and said information transmitting means is capable of transmitting information to a camera body only when the diaphragm setting ring is set to the minimum diaphragm aperture.

4. An attachment member as defined in claim 3, wherein said substantially circular body includes a cut-away portion at such a position that said cut-away portion is adapted to be registered with a f-number graduation scale extending about the circumference of a diaphragm setting ring of a lens when said circular body is attached to said diaphragm setting ring at the predetermined circular position and thereby function as said circular position indicating means, the circular length of said cut-away portion corresponding to the length of said f-number graduation scale.

5. An attachment as defined in claim 3, wherein said substantially circular body includes a transparent portion such that the transparent portion may be registered with a f-number graduation scale extending about the circumference of a diaphragm setting ring of an exchangeable lens when said circular body is attached to said diaphragm setting ring at the predetermined circular position, and thereby function as said circular position indicating means, the circular length of said transparent portion corresponding to the length of said f-number graduation scale.

6. An attachment member as defined in claim 5, wherein said substantially circular body includes a cut-away portion at such a position that an information transmitting means of an exchangeable lens may be positioned within said cut-away portion when said circular body is attached at the predetermined position to a diaphragm setting ring of such a lens.

7. An attachment member as defined in claim 2, further including means for restricting the circular movement of said substantially circular body relative to an exchangeable lens.

8. An attachment member as defined in claim 7, wherein said substantially circular body has a dimension such as to be able to be attached to the outer periphery of a diaphragm setting ring of an exchangeable lens and said circular movement restricting means of the substantially circular body includes an engaging portion which is adapted to engage with an engaging portion provided on the diaphragm setting ring.

9. An attachment member as defined in claim 2, wherein said substantially circular body has a dimension such as to be able to be attached to the outer periphery of a fixed outer sleeve of an exchangeable lens whereby said information transmitting means of the attachment member is capable of transmitting information to a camera body regardless of the aperture to which a diaphragm setting ring of the exchangeable lens is set.

10. An attachment member as defined in claim 9, wherein said angular position indicating means of said substantially circular body includes an indexing portion provided at such a position to be registered with an indexing portion on an outer sleeve of an exchangeable lens when the substantially circular body is attached to said outer sleeve at the predetermined position.

11. An attachment member as defined in claim 10, wherein the indexing portion of the substantially circular body has such configuration and dimension so as to be able to engage with an index member of an outer sleeve of an exchangeable lens thereby restricting the circular movement of said substantially circular body relative to the outer sleeve when said circular body is attached to the outer sleeve at the predetermined position.

12. An attachment as defined in claim 10, wherein said attachment member is adapted to engage an outer sleeve of an exchangeable lens, and said information transmitting means of said attachment member includes a portion for releasably engaging a diaphragm setting ring of the lens thereby preventing undesired rotation of said diaphragm setting ring when said substantially circular body is attached to said outer sleeve.

13. An attachment member as defined in claim 1, wherein said substantially circular body comprises a pair of semi-circular bodies, means for pivotably supporting one end of each of said semi-circular bodies with one another, and means for releasably locking the other ends of each of said semi-circular bodies with one another.

14. An attachment member as defined in claim 1, further including means for indicating the position of said substantially circular body at which said circular body is to be attached to an exchangeable lens in the direction of the optical axis of said exchangeable lens.

15. An attachment member as defined in claim 1, further comprising means for restricting the movement of said substantially circular body relative to an exchangeable lens in the direction of the optical axis of the exchangeable lens.

16. An attachment member as defined in claim 1, wherein said substantially circular body is of resilient material.

17. An attachment member as defined in claim 1, wherein the substantially circular body bears thereon an indicating mark for indicating the type of exchangeable lens with which said attachment member may be used.

18. In combination an attachment member and a camera including an exchangeable lens and a camera body, said exchangeable lens mounted on said camera body and including a diaphragm setting ring manually rotatable for setting a desired diaphragm aperture and first information transmitting means arranged on said diaphragm setting ring for transmitting to said camera body first information as to the step-difference between a minimum f-number of said interchangeable lens and a set f-number corresponding to the diaphragm aperture set by said diaphragm setting ring, said attachment comprising:
a substantially circular body releasably attached to the outer periphery of said exchangeable lens; and
second information transmitting means arranged on said substantially circular body at an angular position thereon dependent on the maximum f-number of said exchangeable lens, the second information transmitting means for transmitting to said camera body second information as to the maximum f- number of said exchangeable lens when said substantially circular body is attached to said exchangeable lens at a predetermined angular position whereby, with said diaphragm setting ring of the lens set to a minimum aperture corresponding to said maximum $f$-number, information as to the minimum $f$-number of said interchangeable lens can be obtained within said camera body when said first and second information thus transmitted to said camera body is combined.

19. A combination as defined in claim 18, wherein said attachment member includes means for indicating the predetermined angular position of said substantially circular body at which said substantially circular body is to be attached to said exchangeable lens.

20. A combination as defined in claim 19, wherein said substantially circular body of said attachment member has a dimension such as to be able to be attached to the outer periphery of said diaphragm setting ring and said second information transmitting means is capable of transmitting said second information to said camera body when said diaphragm setting ring of said exchangeable lens is set to the minimum diaphragm aperture.

21. A combination as defined in claim 20, wherein said diaphragm setting ring of the lens bears thereon a $f$-number graduation scale ranging from the minimum to the maximum $f$-number of said exchangeable lens and extending about the circumference of the ring, and said angular position indicating means of the substantially circular body includes a cut-away portion provided on said substantially circular body at such a position that said cut-away portion may be registered with said $f$-number graduation scale when said substantially circular body is attached to said diaphragm setting ring at the predetermined circular position, the circular length of said cut-away portion corresponding to the length of said $f$-number graduation scale.

22. A combination as defined in claim 20, wherein said diaphragm setting ring of the lens bears thereon a $f$-number graduation scale ranging from the minimum to the maximum $f$-numbers of said exchangeable lens and extending about the circumference of the ring, and said angular position indicating means includes a transparent portion provided on said substantially circular body at such a position that said transparent portion may be registered with said $f$-number graduation scale when said substantially circular body is attached to said diapharagm setting ring at the predetermined circular position, the circular length of said transparent portion corresponding to the length of said $f$-number graduation scale.

23. A combination as defined in claim 20, wherein said substantially circular body includes a cut-away portion at such a position that said first information transmitting means may be positioned within said cut-away portion when said substantially circular body is attached to said diaphragm setting ring at the predetermined position.

24. A combination as defined in claim 19, wherein the attachment member includes means for restricting the circular movement of said substantially circular body relative to said exchangeable lens.

25. A combination as defined in claim 24, wherein said substantially circular body has such a dimension to be attached to the outer periphery of said diaphragm setting ring, and said circular movement restricting means includes a first engaging portion provided on said substantially circular body and a second engaging portion is provided on said diaphragm setting ring and engageable with said first engaging portion.

26. A combination as defined in claim 19, wherein said exchangeable lens includes a fixed outer sleeve, and said substantially circular body has a dimension such as to be able to be attached to the outer periphery of said outer sleeve, whereby said second information transmitting means is capable of transmitting said second information to said camera body regardless of the aperture to which said diaphragm setting ring is set.

27. A combination as defined in claim 26, wherein said angular position indicating means of said attachment member includes a first indexing portion provided on said outer sleeve and a second indexing portion provided on said substantially circular body, said second indexing portion being provided at such a position to be registered with said first indexing portion when said substantially circular body is attached to said outer sleeve at the predetermined position.

28. A combination as defined in claim 27, wherein said first and second indexing portion have configuration and dimension to enable engagement with one another for restricting the circular position of said substantially circular body relative to said outer sleeve when said substantially circular body is attached to said outer sleeve at the predetermined position.

29. A combination as defined in claim 27, wherein said outer sleeve is adjacent to said diaphragm setting ring, and said second information transmitting means includes a portion for releasably engaging said diaphragm setting ring when said substantially circular body is attached to said outer sleeve.

30. A combination as defined in claim 18, wherein said substantially circular body comprises a pair of semicircular bodies, means for pivotably supporting one end of each semi-circular body with each other, and means for releasably locking the other end of each semi-circular body with each other.

31. A combination as defined in claim 18, the attachment member further including means for indicating the position of said substantially circular body at which said substantially circular body is to be attached to said exchangeable lens in the direction of the optical axis of said exchangeable lens.

32. A combination as defined in claim 18, the attachment member further including means for restricting the movement of said substantially circular body relative to said exchangeable lens in the direction of the optical axis on said exchangeable lens.

33. A combination as defined in claim 18, wherein said substantially circular body is of resilient material.

34. A combination as defined in claim 18, wherein said substantially circular body bears thereon an indicating mark for indicating with what type of an exchangeable lens said attachment member may be used.

* * * * *

UNITED STATES PATENT OFFICE
CERTIFICATE OF CORRECTION

PATENT NO. : 4,101,223
DATED : July 18, 1978
INVENTOR(S) : Shuzo Matsushita

It is certified that error appears in the above-identified patent and that said Letters Patent are hereby corrected as shown below:

[75]   Inventor:   Shuzo Matsushita

Signed and Sealed this

Twentieth Day of February 1979

[SEAL]

Attest:

RUTH C. MASON
*Attesting Officer*

DONALD W. BANNER
*Commissioner of Patents and Trademarks*